US011735390B2

(12) United States Patent
Berardengo et al.

(10) Patent No.: US 11,735,390 B2
(45) Date of Patent: Aug. 22, 2023

(54) CIRCUIT BREAKER STATUS INDICATING SYSTEM FOR SWITCHGEAR AUXILIARY SWITCH

(71) Applicant: Schneider Electric USA, Inc., Andover, MA (US)

(72) Inventors: Florent Berardengo, Saint Jean de Moirans (FR); Nicolas Chaboud, Grenoble (FR); Mingmin Chen, Xiamen (CN); Junming Yang, Xiamen (CN)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 17/562,258

(22) Filed: Dec. 27, 2021

(65) Prior Publication Data
US 2022/0208496 A1    Jun. 30, 2022

Related U.S. Application Data

(60) Provisional application No. 63/131,483, filed on Dec. 29, 2020.

(51) Int. Cl.
*H01H 71/04*    (2006.01)

(52) U.S. Cl.
CPC ....... *H01H 71/04* (2013.01); *H01H 2071/046* (2013.01)

(58) Field of Classification Search
CPC .... H01H 71/04; H01H 2071/046; H01H 9/24; H02B 11/133; H02B 13/00
USPC .......................... 200/50.24, 50.21–50.32, 308
See application file for complete search history.

(56) References Cited

U.S. PATENT DOCUMENTS

| 4,176,262 A | 11/1979 | McMillen et al. |
| 5,304,755 A | 4/1994 | Romano et al. |
| 2012/0241296 A1* | 9/2012 | Webb ..................... H02B 11/10 200/337 |

FOREIGN PATENT DOCUMENTS

| KR | 19990027103 | 7/1999 |
| WO | 2012134847 A1 | 10/2012 |

OTHER PUBLICATIONS

EP Extended Search Report for EP Application No. 21217606.9 dated May 18, 2022.

* cited by examiner

*Primary Examiner* — Edwin A. Leon
*Assistant Examiner* — Iman Malakooti
(74) *Attorney, Agent, or Firm* — Locke Lord LLP

(57) ABSTRACT

Systems and methods for indicating an operational status of a circuit breaker within a switchgear comprise providing a mechanism-operated control (MOC) assembly arranged within a housing of the circuit breaker. A drive plate is slidably mounted on a wall of the switchgear adjacent to the MOC assembly. A drive arm is pivotably mounted at one end on the wall of the switchgear, the drive arm engaged at an opposite end thereof with the drive plate. A status indicator is disposed on the wall of the switchgear, wherein changing an operational state of the circuit breaker mechanically operates the MOC assembly to slide the drive plate in a direction that pivots the drive arm from a first position to a second position, the first and second positions of the drive arm being visible externally of the switchgear through the status indicator.

13 Claims, 7 Drawing Sheets

CIRCUIT BREAKER STATUS INDICATING SYSTEM FOR SWITCHGEAR AUXILIARY SWITCH

CROSS REFERENCE TO RELATED APPLICATIONS

This application claims the benefit of and priority to U.S. Provisional Application No. 63/131,483 filed on Dec. 29, 2020 under 35 U.S.C. 119(e), which application is incorporated by reference herein in its entirety.

TECHNICAL FIELD

Embodiments of the present disclosure relate generally to electrical switchgears and circuit breakers and, more particularly, to systems and methods for visually indicating an operational status of a circuit breaker within a switchgear in conjunction with actuating a switchgear auxiliary switch.

BACKGROUND

Electrical switchgears provide electrical protection, isolation, and control of electrical power. A typical switchgear may house a circuit breaker, various switches, fuses, relays, and similar electrical switching equipment within a metal enclosure or cabinet. A circuit breaker cubicle or cell, which is a compartment in the switchgear cabinet, typically houses the circuit breaker. A motorized racking mechanism is typically used to move the circuit breaker in and out of the cubicle. The breaker may be in a fully inserted working position, a test position where the breaker is partially inserted, or a withdrawn position.

At present, circuit breaker status information, such as whether the breaker is in a closed operational state or an open operational state, is often provided via a status indicator that is integrated on the circuit breaker. However, an integrated status indicator is difficult for operators to observe when the circuit breaker is racked in or partially in the switchgear cubicle. It would be much easier and more convenient for operators to observe the breaker operational status directly from the switch cabinet.

Thus, while a number of advances have been made in the field of electrical switchgears and circuit breakers, it will be readily appreciated that improvements are continually needed.

SUMMARY

Embodiments of present disclosure generally relate to systems and methods for providing a circuit breaker operational status indicator that can be observed directly from a switch cabinet. The operational status indicator is provided in conjunction with actuating a switchgear auxiliary switch, where the components used to actuate the auxiliary switch operate entirely mechanically and automatically. This provides a highly reliable way to actuate the switchgear auxiliary switch while at the same time displaying the breaker operational status. Because the components are entirely mechanical, their physical positions can be visually observed, thus providing a visual indication of the operational status of the circuit breaker. Moreover, the systems and methods disclosed herein operate equally effectively whether the circuit breaker is in a working position or a test position.

In general, in one aspect, the present disclosure relates to a mechanism-operated control (MOC) assembly for a circuit breaker. The MOC comprises, among other things, a drive assembly arranged within the circuit breaker and fixedly attached to an output shaft of the circuit breaker. The MOC further comprises a drive pin hingedly attached to the drive assembly within the circuit breaker, the drive pin extending through a guide slot formed in a housing of the circuit breaker. Changing an operational state of the circuit breaker rotates the output shaft, causing the drive assembly to rotate, thereby moving the drive pin within the guide slot.

In general, in another aspect, the present disclosure relates to a system for indicating an operational status of a circuit breaker within a switchgear. The system comprises, among other things, an MOC assembly arranged within a housing of the circuit breaker, and a drive plate slidably mounted on an interior surface of a wall of the switchgear adjacent to the MOC assembly. The system further comprises a drive arm pivotably mounted at one end an secured to the wall of the switchgear, the drive arm engaged at an opposite end thereof with the drive plate, and a status indicator disposed on the wall of the switchgear. Changing an operational state of the circuit breaker mechanically operates the MOC assembly to slide the drive plate in a direction that pivots the drive arm from a first position to a second position, the first and second positions of the drive arm being visible externally of the switchgear through the status indicator.

In general, in yet another aspect, the present disclosure relates to a method of providing an indication of an operational status of a circuit breaker within a switchgear. The method comprises, among other things, arranging a mechanism-operated control (MOC) assembly within a housing of the circuit breaker and mounting a drive plate slidably on an interior surface of a wall of the switchgear adjacent to the MOC assembly. The method further comprises securing a drive arm pivotably mounted at one end to the wall of the switchgear, the drive arm engaged at an opposite end thereof with the drive plate; and providing a status indicator on the wall of the switchgear. Changing an operational state of the circuit breaker mechanically operates the MOC assembly to slide the drive plate in a direction that pivots the drive arm from a first position to a second position, the first and second positions of the drive arm being visible externally of the switchgear through the status indicator.

In accordance with any one or more of the foregoing embodiments, the drive assembly comprises a drive arm fixedly attached at one end thereof to the output shaft of the circuit breaker, and optionally further comprises a connecting arm hingedly attached at one end thereof to the drive arm at an opposite end thereof, the connecting arm hingedly attached at an opposite end thereof to the drive pin.

In accordance with any one or more of the foregoing embodiments, the drive plate comprises a main body, a work portion extending in one direction from the main body, and a test portion extending in an opposing direction from the main body, wherein the MOC assembly is located adjacent the work portion when the circuit breaker is in a working position within the switchgear, and wherein the MOC assembly is located adjacent the test portion when the circuit breaker is in a test position within the switchgear.

In accordance with any one or more of the foregoing embodiments, a return spring is attached to the drive plate, the return spring being anchored to the wall of the switchgear to thereby bias the drive plate in a predefined direction.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

This description and the accompanying drawings illustrate exemplary embodiments of the present disclosure and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is noted that, as used in this specification and the appended claims, the singular forms "a," "an," and "the," and any singular use of any word, include plural references unless expressly and unequivocally limited to one reference. As used herein, the term "includes" and its grammatical variants are intended to be non-limiting, such that recitation of items in a list is not to the exclusion of other like items that can be substituted or added to the listed items.

Figure 1A:
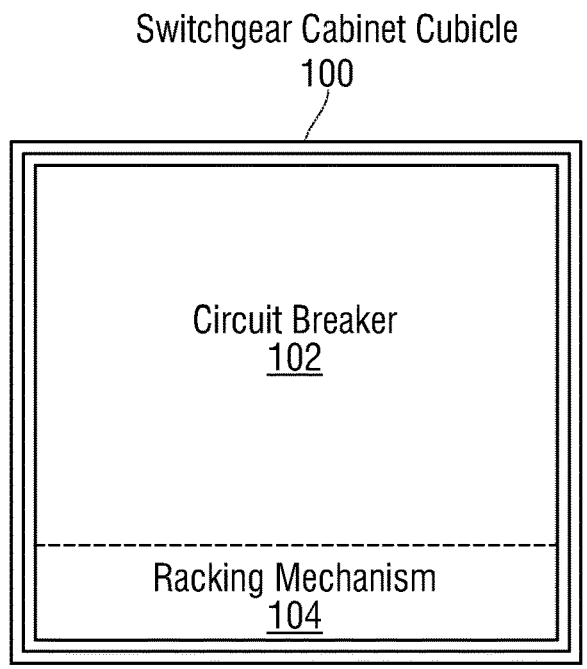
FIGS. 1A-1B illustrate exterior front and side views, respectively, of an exemplary switchgear cubicle and circuit breaker according to embodiments of the present disclosure.
Figure 1B:
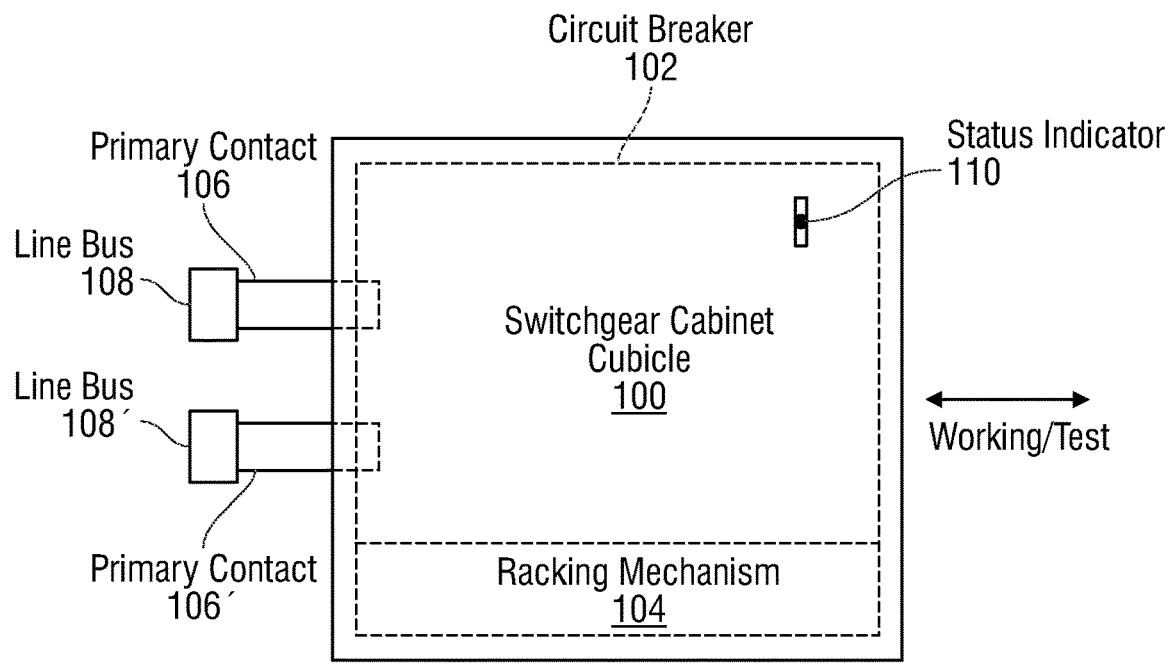

Referring now to FIGS. 1A-1B, a front view and side view, respectively, of a switchgear cabinet cubicle 100 is shown with a circuit breaker 102 racked therein. The circuit breaker 102 includes an integral motorized racking mechanism 104 that can be used to automatically rack the breaker 102 in and out of the cubicle 100. For example, the racking mechanism 104 can move the breaker 102 between a working position and a test position, as represented by the double-headed working/test arrow. Also shown are a line side primary contact 106, which is the breaker line side power connector (primary electrical plug or stabs), connected to a line bus 108, which is the main line connector of the switchgear. A load side or secondary contact 106' of the breaker 102 is similarly connected to the switchgear load bus 108'.

In the side view of FIG. 1B, a status indicator 110 can be seen on the side of the switchgear cubicle 100, for example, near an upper right corner thereof. In other embodiments, the status indicator 110 may be located at a different location from the one shown, such as the lower right corner, the upper left corner, the lower left corner, in the middle, and so forth. In either case, the status indicator 110 provides operators with a convenient external visual indication of the status of the circuit breaker 102 while the breaker is within the cubicle 100. In the example shown, the status indicator 110 is in the form of a window that allows operators to look into the switchgear cubicle 100 and see the position of an auxiliary switch (FIG. 3) therebehind. When the auxiliary switch is in an up position, the breaker 102 is in a closed state, and when the auxiliary switch is in a down position, the breaker 102 is in an open state.

Figure 2:
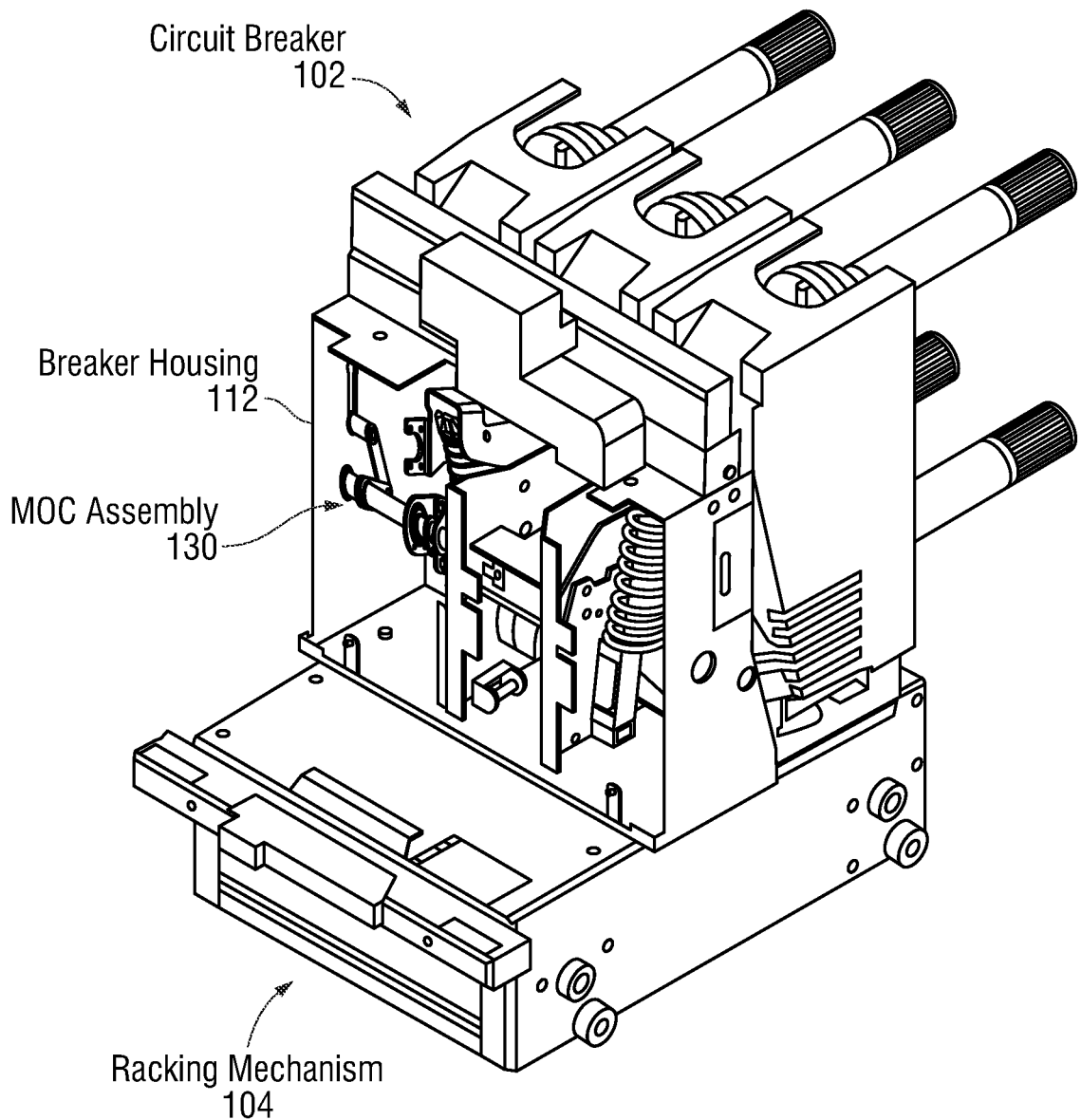
FIG. 2 illustrates a perspective view inside of an exemplary circuit breaker according to embodiments of the present disclosure.

FIG. 2 shows an internal perspective view of the exemplary circuit breaker 102 according to some embodiments. From this view, additional details can be seen about the breaker 102, including details about the racking mechanism 104, as well as various components housed within a breaker housing 112. In particular, a circuit breaker MOC (mechanism-operated control) assembly 130 is arranged within the breaker housing 112. The MOC assembly 130 functions to actuate an external auxiliary switch, shown in FIG. 3, when the circuit breaker 102 is put in a closed operational state.

Figure 3:
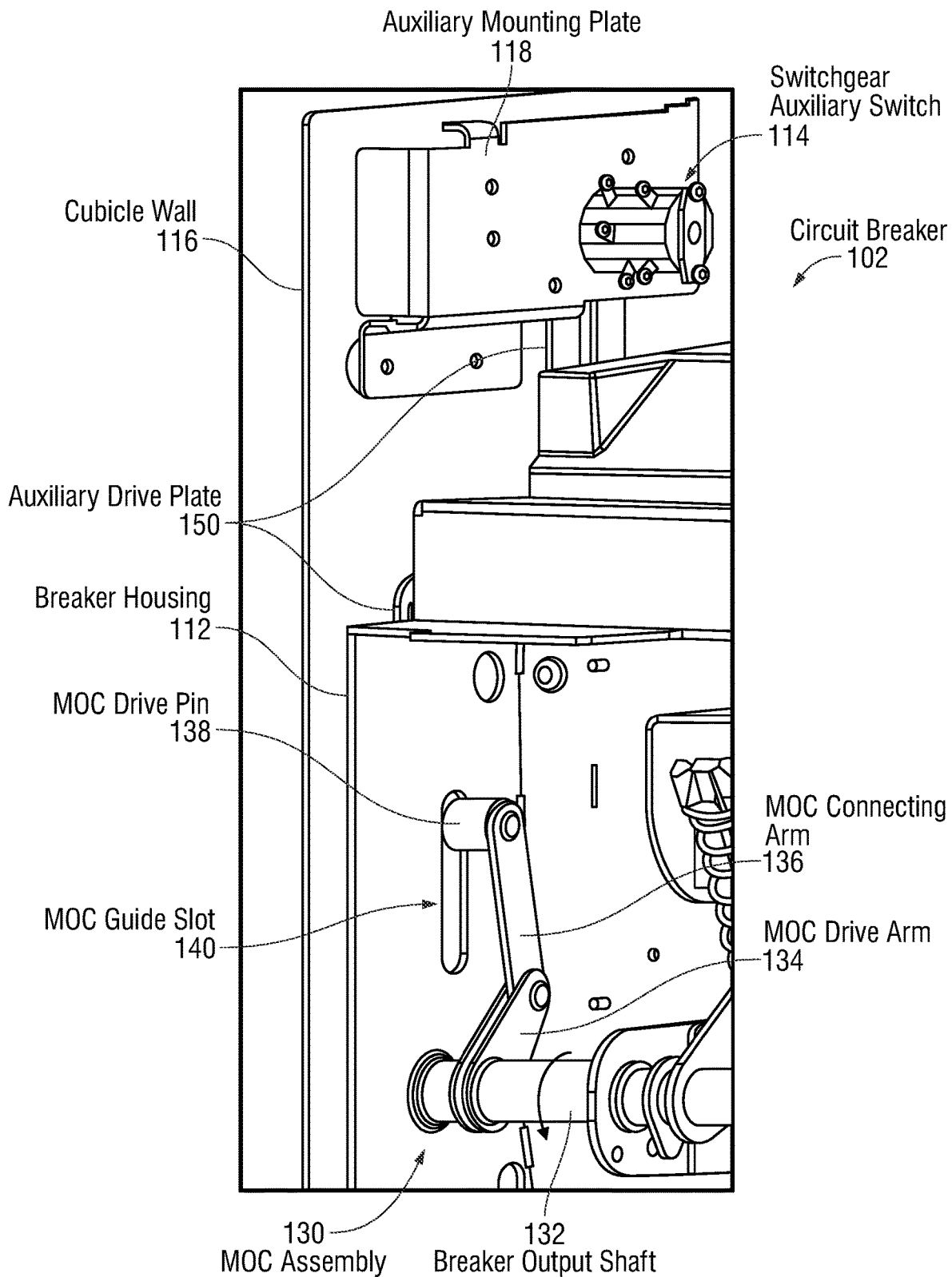
FIG. 3 illustrates a close-up inside view of the circuit breaker and an MOC assembly according to embodiments of the present disclosure.

Referring to FIG. 3, a close-up interior view of the exemplary circuit breaker 102 and the MOC assembly 130 therein is shown, along with the external auxiliary switch 114. In general, circuit breakers are often equipped with an external auxiliary switch that functions to open and close secondary connections in the circuit breakers. For example, the auxiliary switch may close a connection that supplies operating power to the circuit breaker when the circuit breaker is put in a closed state. As mentioned, the auxiliary switch can also provide operators with a visual indication of the operational status of the circuit breaker, such as whether the breaker is closed or open.

In the FIG. 3 example, the auxiliary switch 114 is mounted to a cubicle wall 116 of the switchgear cubicle 100 via an auxiliary mounting plate 118 secured to an interior surface of the left side cubicle wall (when viewed from the front). When the breaker 102 is put in a closed state, the MOC assembly 130 mechanically and automatically actuates the auxiliary switch 114 into a closed position. Likewise, when the breaker 102 is put in an open state, the MOC assembly 130 mechanically and automatically actuates the auxiliary switch 114 into an open position. This actuation of the auxiliary switch 114 starts at a breaker output shaft 132, which rotates either clockwise or counterclockwise when the breaker 102 is put in either a closed or an open state. The amount of rotation of the breaker output shaft 132 is about 45 degrees to about 90 degrees in either direction in some embodiments, though a different rotation range may certainly be used.

An MOC drive arm 134 is fixedly attached at one end to the breaker output shaft 132, such that the other (opposite) end of the MOC drive arm 134 travels along an arc when the breaker output shaft 132 rotates. That other end of the MOC drive arm 134 is hingedly attached to one end of an MOC connecting arm 136. The other end of the MOC connecting arm 136 is hingedly attached to an MOC drive pin 138. The MOC drive pin 138 occupies a generally vertical MOC guide slot 140, such that part of the MOC drive pin 138 is within the breaker housing 112 and part of the pin 138 protrudes externally into the breaker housing 112 through the MOC guide slot 140. The MOC guide slot 140 serves to confine the movement of the drive pin 138 within the guide slot 140.

In general operation, when the breaker 102 is put in a closed state, the breaker output shaft 132 rotates in the direction indicated by the curved arrow. This rotation causes the MOC drive arm 134 to swing in the same direction, thereby driving the MOC connecting arm 136 in an upward direction. The upward movement of the MOC connecting arm 136 causes the MOC drive pin 138 to travel upward in the MOC guide slot 140. When the breaker 102 is put in an open state (e.g., via a reset operation), the breaker output shaft 132 rotates in the opposite direction, thereby causing the MOC drive pin 138 to travel downward in the MOC guide slot 140. The upward and downward travel of the MOC drive pin 138 actuates the auxiliary switch 114 into the closed and open position, as discussed with respect to FIG. 4.

Figure 4:
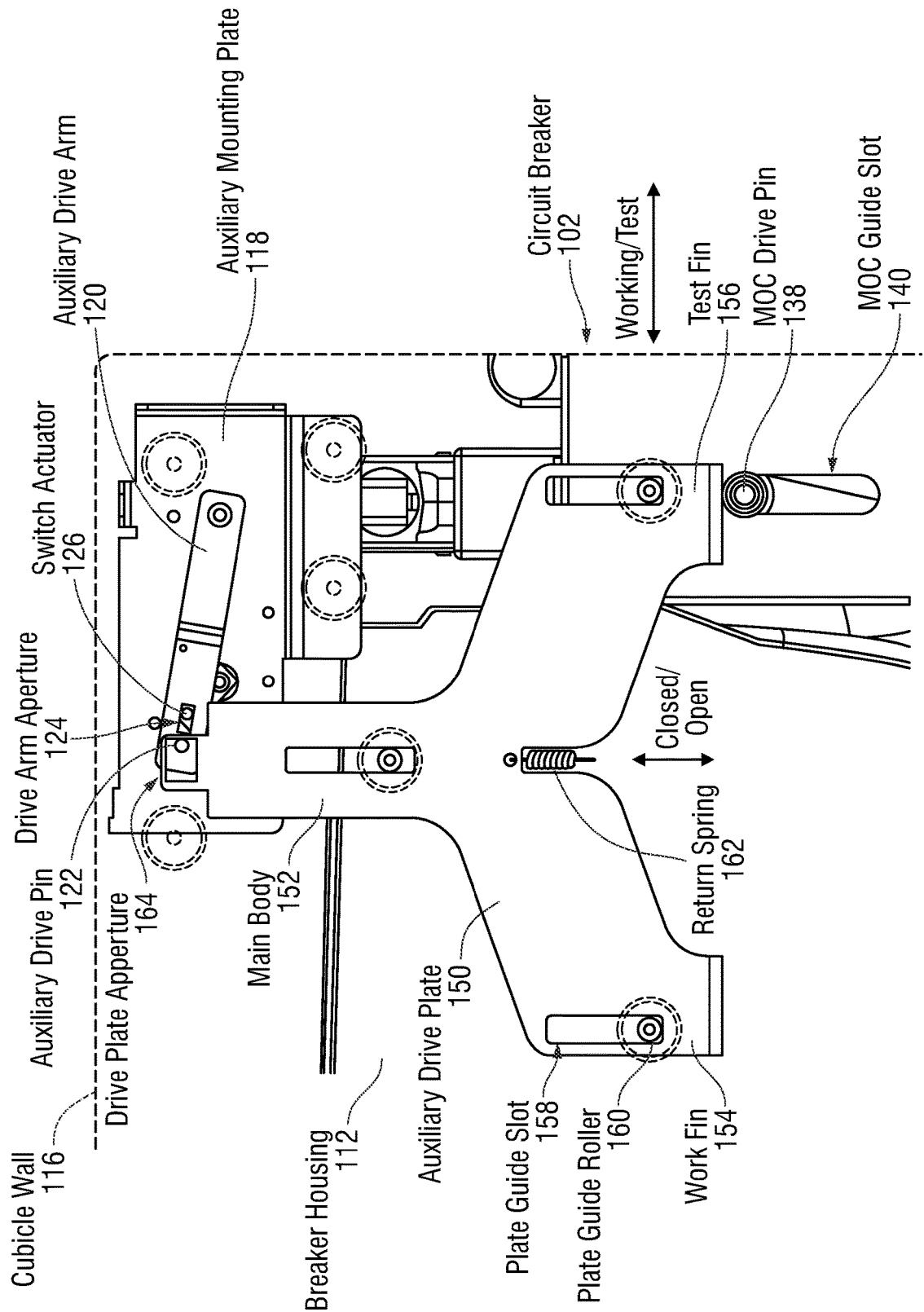
FIG. 4 illustrates an internal side view of an exemplary switchgear cubicle according to embodiments of the present disclosure.

FIG. 4 shows an internal side view of an exemplary switchgear cubicle 100 with the cubicle wall 116 shown in outline only (see dashed lines) to expose the mounting plate 118 of the auxiliary switch 114 and the circuit breaker 102 therebehind. An auxiliary drive plate 150 is also mounted to the interior surface of the cubicle wall 116 (as partly seen in FIG. 3). As this view shows, the upward travel of the MOC drive pin 138 slides the auxiliary drive plate 150 in an upward direction. The auxiliary drive plate 150 in this example resembles a fish tail insofar as there is a main body 152 that extends downward and splits out into two fins, a work fin 154 on the left-hand side and a test fin 156 on the right-hand side. Each of the main body 152, work fin 154, and test fin 156 includes a vertically extending plate guide slot 158 formed therein that allows the auxiliary drive plate 150 to be slidably mounted on the interior surface of the cubicle wall 116 via guide plate rollers 160 within each plate guide slot 158.

As mentioned, when the circuit breaker 102 is put in a closed state, the MOC drive pin 138 travels upward in the MOC guide slot 140, which slides the auxiliary drive plate 150 in an upward direction. When the breaker 102 is put in an open state (e.g., via a reset operation), the MOC drive pin 138 travels downward in the MOC guide slot 140, which allows the auxiliary drive plate 150 to slide back in a downward direction. In some embodiments, a return spring 162 is attached at one end to the auxiliary drive plate 150 to bias the auxiliary drive plate 150 toward a downward direction. The other end of the return spring 162 may be anchored to any suitable location on the cubicle wall 116.

The upward and downward sliding of the auxiliary drive plate 150 pivots an auxiliary drive arm 120 up and down accordingly to actuate the auxiliary switch 114 (FIG. 3). In particular, one end of the auxiliary drive arm 120 is pivotably attached to the cubicle wall 116, while the free (opposite) end engages the auxiliary drive plate 150. Specifically, a drive plate aperture 164 at the tip of the auxiliary drive plate 150 in some embodiments engages an auxiliary drive pin 122 protruding from the free end of the auxiliary drive arm 120 in some embodiments. In a similar manner, a drive arm aperture 124 at the free end of the auxiliary drive arm 120 in some embodiments engages a switch actuator 126 for the auxiliary switch 114 in some embodiments.

The result of the above is, when the auxiliary drive arm 120 is pivoted to an up position, the auxiliary switch 114 is put into a closed position, and when the auxiliary drive arm 120 is pivoted to a down position, the auxiliary switch 114 is put into an open position. Beneficially, the entire process of actuating the auxiliary switch 114 is mechanical and automatic, and therefore highly reliable. In addition, the up and down positions of the auxiliary drive arm 120 is visible at the status indicator 110 (through the window thereof), thereby allowing operators to see the operational status of the circuit breaker 102 while the breaker is inside the switchgear cubicle 100.

Moreover, the dual fin arrangement of the auxiliary drive plate 150 allows the operational status of the circuit breaker 102 to be ascertained regardless of whether the breaker 102 is in a working position or a test position. For example, when the circuit breaker 102 is in a test position, the MOC drive pin 138 is located adjacent to (underneath) the test fin 156. Moving the breaker 102 into a working position within the switchgear cubicle 100 relocates the MOC drive pin 138 adjacent to (underneath) the work fin 154.

Figure 5:
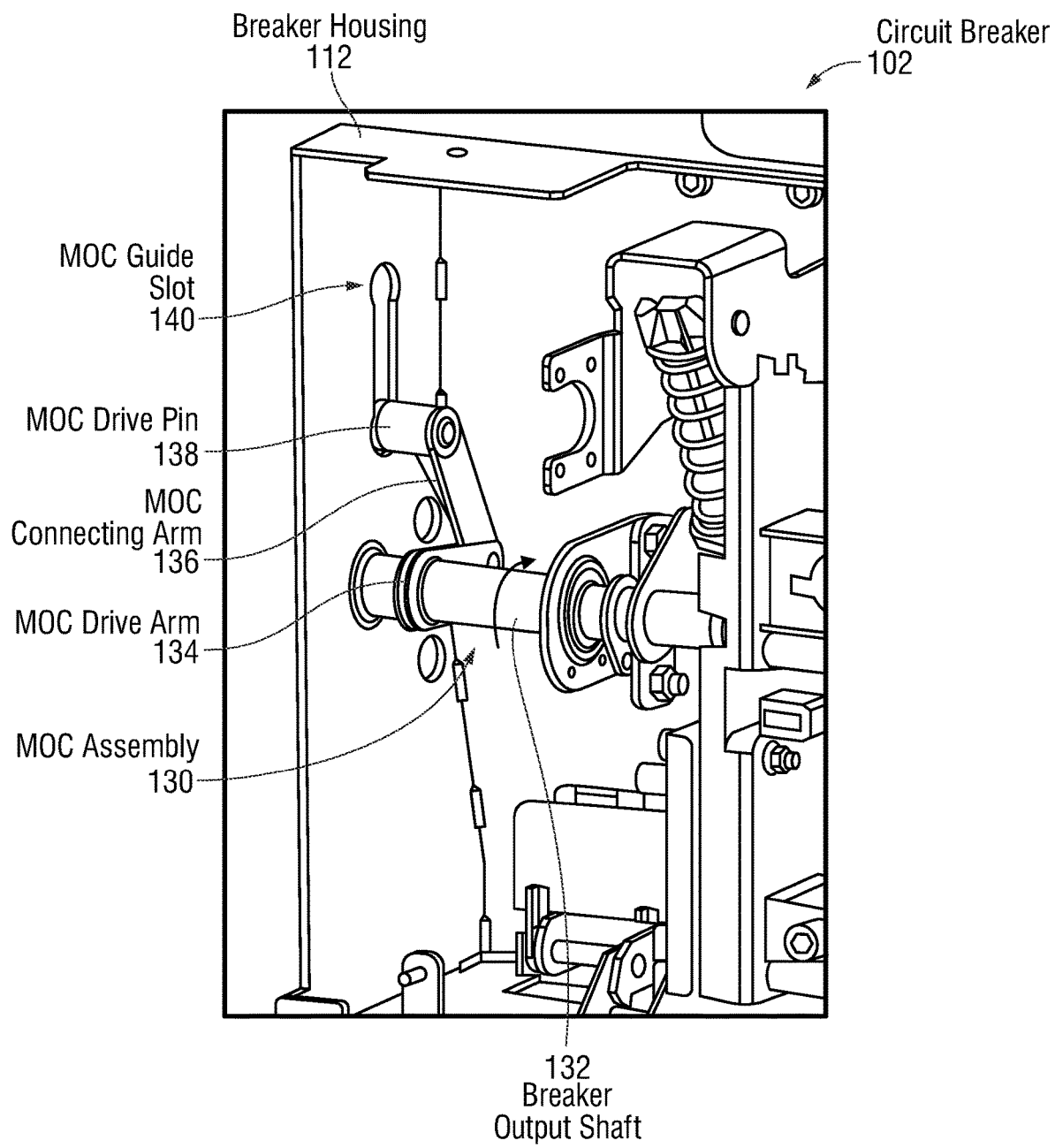
FIG. 5 illustrates another close-up inside view of the exemplary circuit breaker and MOC assembly according to embodiments of the present disclosure.

FIG. 5 shows a close-up interior view of the circuit breaker 102 and the MOC assembly 130 therein similar to the view shown in FIG. 3, except that the MOC drive pin 138 here is in the downward or open position.

Figure 6:
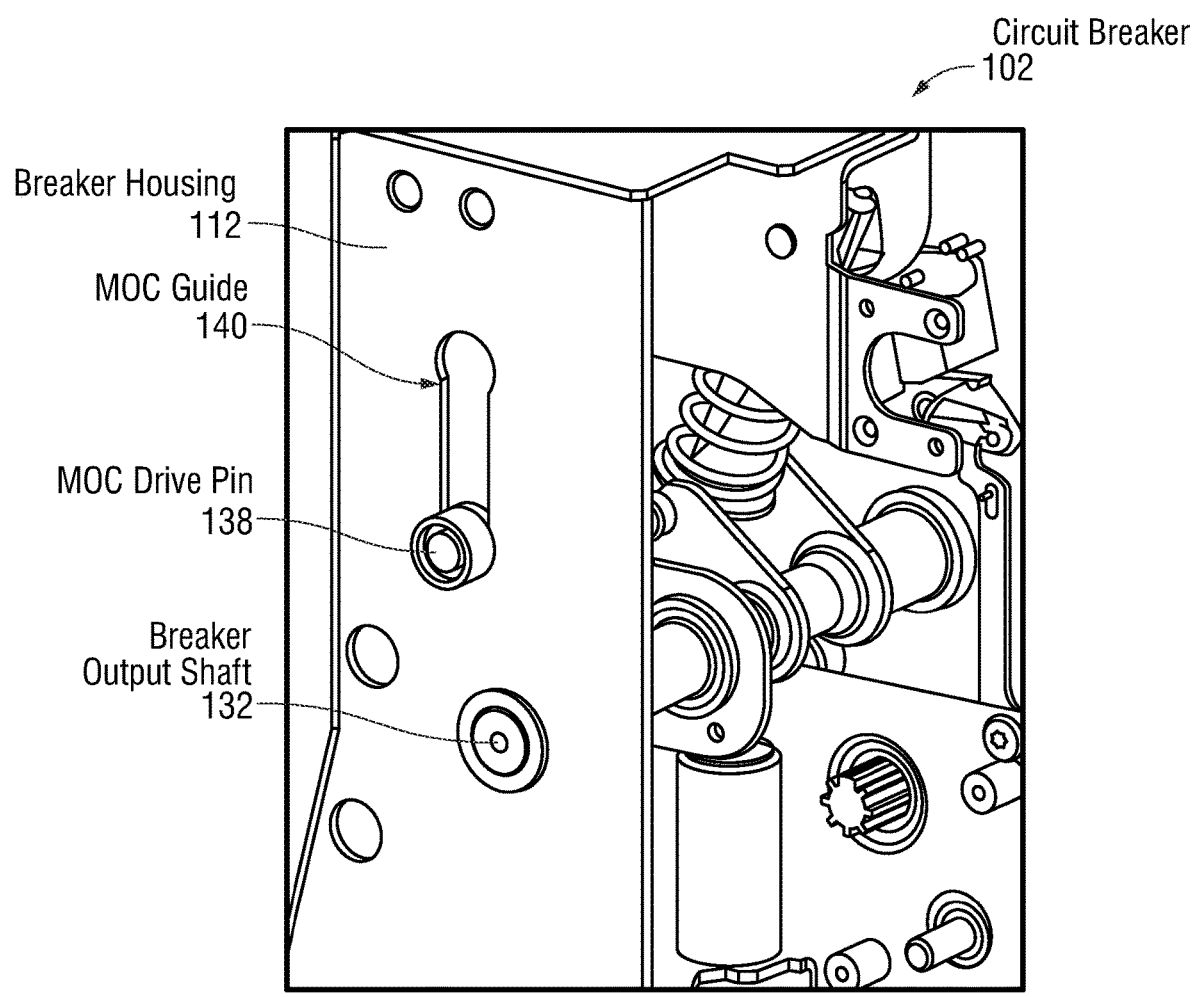
FIG. 6 illustrates an internal side view of the exemplary circuit breaker and MOC assembly from FIG. 5.

FIG. 6 shows a close-up external side view of the circuit breaker 102 again showing the MOC drive pin 138 in the downward or open position.

Figure 7:
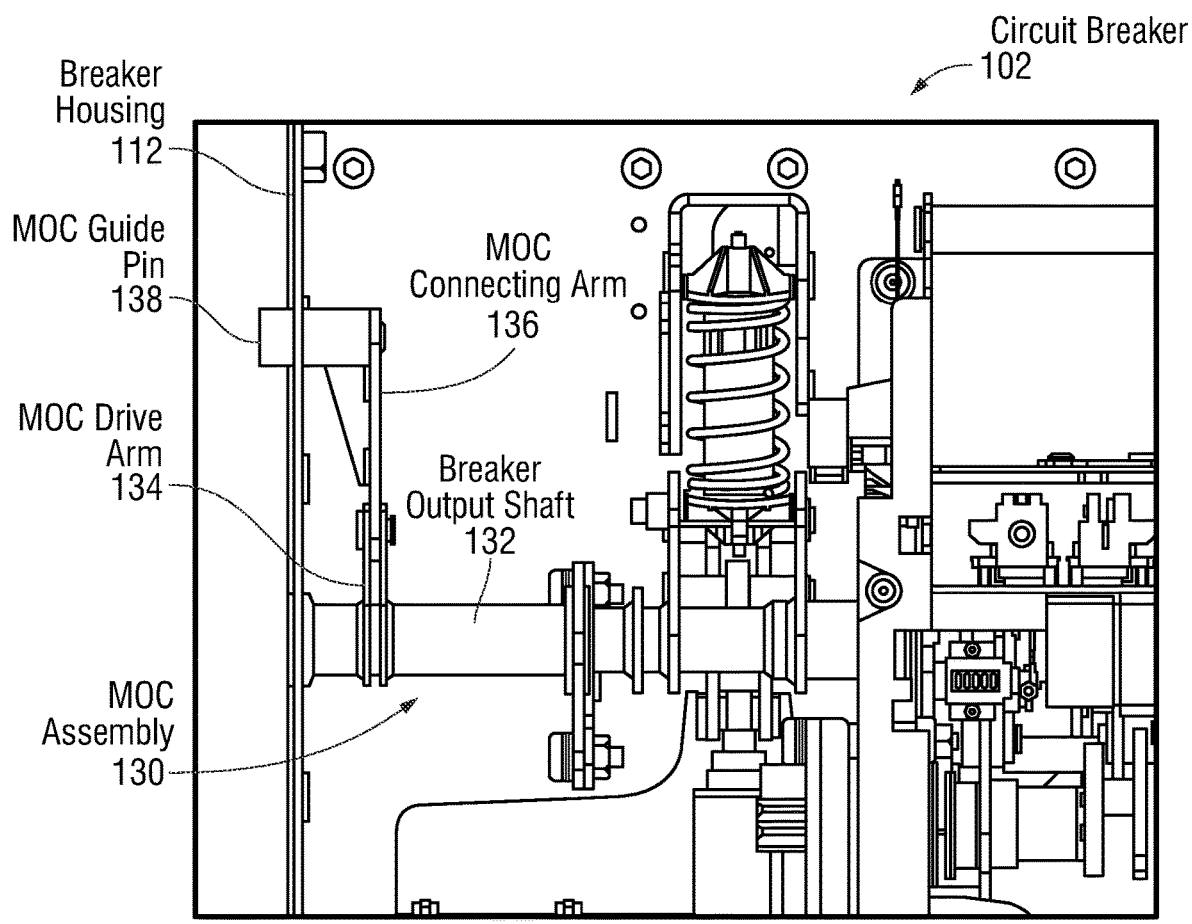
FIG. 7 illustrates an internal front view of the exemplary circuit breaker and MOC assembly according to embodiments of the present disclosure.

FIG. 7 shows an internal front view of the circuit breaker 102 and the MOC assembly 130 therein. As can be more clearly seen in this view, the MOC drive arm 134 may be implemented using two parallel arms hingedly attached to opposite sides of the MOC connecting arm 136. It is of course possible to use just one arm for the MOC drive arm 134 within the scope of the disclosed embodiments.

While several exemplary embodiments of been shown and described, it is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A mechanism-operated assembly for a circuit breaker, comprising:
    a drive assembly arranged within the circuit breaker and fixedly attached to an output shaft of the circuit breaker;
    a drive pin hingedly attached to the drive assembly within the circuit breaker, the drive pin extending through a guide slot formed in a housing of the circuit breaker;
    a drive plate slidably mounted adjacent to the circuit breaker and in contact with the drive pin; and
    a drive arm pivotably mounted at one end and engaged at an opposite end with the drive plate;
    wherein changing an operational state of the circuit breaker rotates the output shaft, causing the drive assembly to rotate, thereby moving the drive pin within the guide slot and sliding the drive plate in a direction that pivots the drive arm from a first position to a second position.

2. The assembly of claim 1, wherein the drive assembly comprises a drive arm fixedly attached at one end thereof to the output shaft of the circuit breaker.

3. The assembly of claim 2, wherein the drive assembly further comprises a connecting arm hingedly attached at one end thereof to the drive arm at an opposite end thereof, the connecting arm hingedly attached at an opposite end thereof to the drive pin.

4. A system for indicating an operational status of a circuit breaker within a switchgear, comprising:
   a mechanism-operated control (MOC) assembly arranged within a housing of the circuit breaker;
   a drive plate slidably mounted on an interior surface of a wall of the switchgear adjacent to the MOC assembly;
   a drive arm pivotably mounted at one end and secured to the wall of the switchgear, the drive arm engaged at an opposite end thereof with the drive plate; and
   a status indicator disposed on the wall of the switchgear;
   wherein changing an operational state of the circuit breaker mechanically operates the MOC assembly to slide the drive plate in a direction that pivots the drive arm from a first position to a second position, the first and second positions of the drive arm being visible externally of the switchgear through the status indicator.

5. The system of claim 4, wherein the MOC assembly comprises a drive assembly arranged within the circuit breaker and fixedly attached to an output shaft of the circuit breaker, and a drive pin hingedly attached to the drive assembly within the circuit breaker, the drive pin extending through a guide slot formed in a housing of the circuit breaker, wherein changing an operational state of the circuit breaker rotates the output shaft, causing the drive assembly to rotate, thereby moving the drive pin within the guide slot.

6. The system of claim 4, wherein the drive plate comprises a main body, a work portion extending in one direction from the main body, and a test portion extending in an opposing direction from the main body, wherein the MOC assembly is located adjacent the work portion when the circuit breaker is in a working position within the switchgear, and wherein the MOC assembly is located adjacent the test portion when the circuit breaker is in a test position within the switchgear.

7. The system of claim 4, further comprising a return spring attached to the drive plate, the return spring anchored to the wall of the switchgear to thereby bias the drive plate in a predefined direction.

8. A method of providing an indication of an operational status of a circuit breaker within a switchgear, comprising:
   arranging a mechanism-operated control (MOC) assembly within a housing of the circuit breaker;
   mounting a drive plate slidably on an interior surface of a wall of the switchgear adjacent to the MOC assembly;
   securing a drive arm pivotably mounted at one end to the wall of the switchgear, the drive arm engaged at an opposite end thereof with the drive plate; and
   providing a status indicator on the wall of the switchgear;
   wherein changing an operational state of the circuit breaker mechanically operates the MOC assembly to slide the drive plate in a direction that pivots the drive arm from a first position to a second position, the first and second positions of the drive arm being visible externally of the switchgear through the status indicator.

9. The method of claim 8, wherein the MOC assembly comprises a drive assembly arranged within the circuit breaker and fixedly attached to an output shaft of the circuit breaker, and a drive pin hingedly attached to the drive assembly within the circuit breaker, the drive pin extending through a guide slot formed in a housing of the circuit breaker, wherein changing an operational state of the circuit breaker rotates the output shaft, causing the drive assembly to rotate, thereby moving the drive pin within the guide slot.

10. The method of claim 8, wherein the drive plate comprises a main body, a work portion extending in one direction from the main body, and a test portion extending in an opposing direction from the main body, wherein the MOC assembly is located adjacent the work portion when the circuit breaker is in a working position within the switchgear, and wherein the MOC assembly is located adjacent the test portion when the circuit breaker is in a test position within the switchgear.

11. The method of claim 8, further comprising biasing the drive plate in a predefined direction using a return spring attached to the drive plate and anchored to the wall of the switchgear.

12. The assembly of claim 1, wherein the drive plate comprises a main body, a work portion extending in one direction from the main body, and a test portion extending in an opposing direction from the main body, wherein the drive pin contacts the work portion when the circuit breaker is in a working position, and wherein the drive pin contacts the test portion when the circuit breaker is in a test position.

13. The assembly of claim 1, further comprising a return spring attached to the drive plate and biasing the drive plate in a predefined direction.

* * * * *